S. M. ISBELL.
WEEDER.
APPLICATION FILED DEC. 12, 1914.
1,158,689.
Patented Nov. 2, 1915.
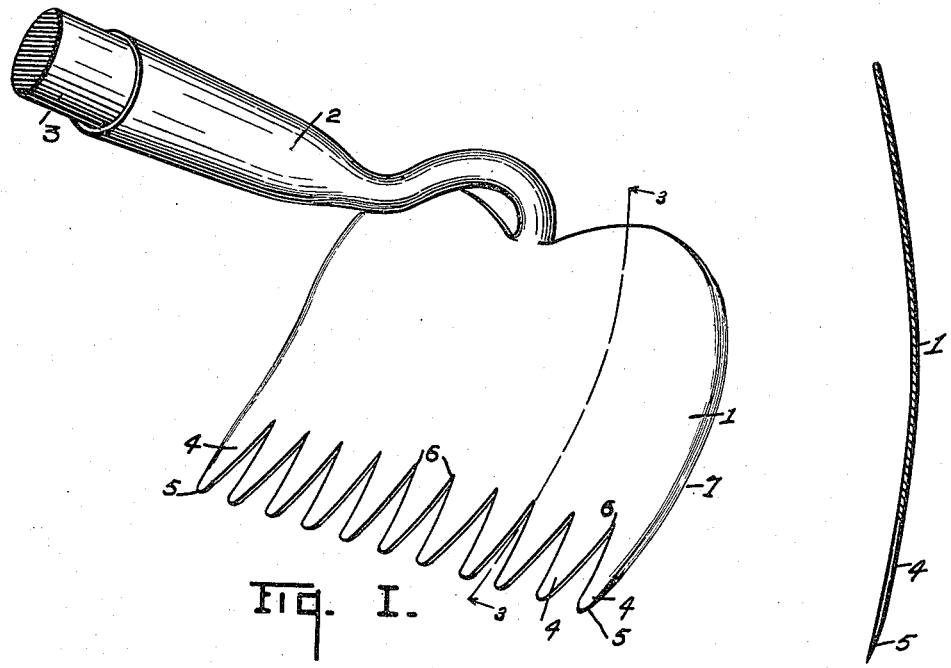
Fig. I.
Fig. III.
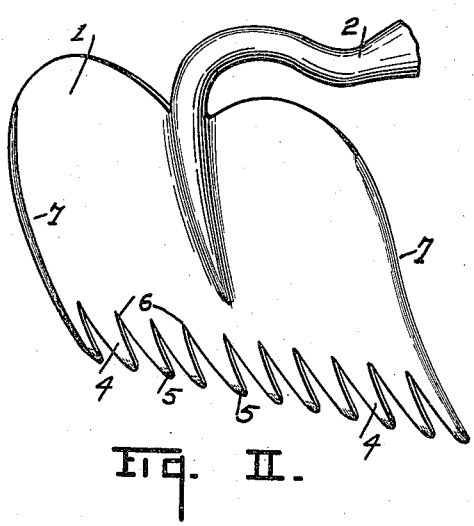
Fig. II.
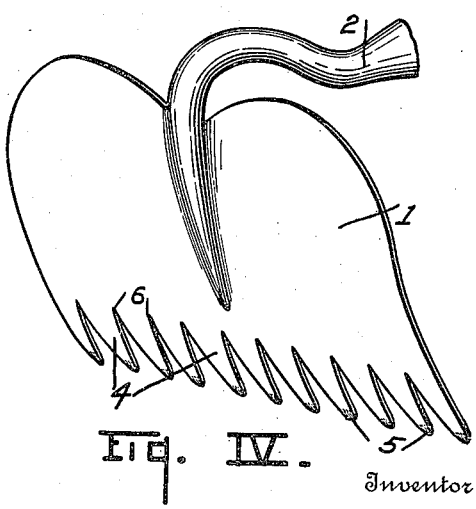
Fig. IV.
Inventor
Sidney M. Isbell
Witnesses
By
Attorneys

UNITED STATES PATENT OFFICE.

SIDNEY M. ISBELL, OF JACKSON, MICHIGAN.

WEEDER.

1,158,689.     Specification of Letters Patent.     Patented Nov. 2, 1915.

Application filed December 12, 1914. Serial No. 876,961.

*To all whom it may concern:*

Be it known that I, SIDNEY M. ISBELL, a citizen of the United States, residing in the city and county of Jackson, State of Michigan, have invented certain new and useful Improvements in Weeders, of which the following is a specification.

This invention relates to improvements in weeders.

The object of this invention is to provide an improved weeding hoe having a plurality of teeth with sharpened points for loosening the ground around the weeds, the upper edges of said teeth being blunt and dull, said teeth forming V-shaped notches for grasping weeds having protruberances or knots to pull the same up, the blade of said hoe being curved so that its serves as a lever fulcrum to facilitate the removing of the weeds.

Further objects and objects relating to details and economies of construction will definitely appear from the detailed description to follow.

I accomplish the objects of my invention by the devices and means described in the following specification.

The invention is clearly defined and pointed out in the claims.

A structure constituting a preferred embodiment of my invention is illustrated in the accompanying drawing, forming a part of this specification, in which:

Figure I is a front perspective view of a weeding hoe constructed in accordance with my invention. Fig. II is a rear perspective view of the hoe. Fig. III is a transverse sectional view on the line 3—3 of Fig. I. Fig. IV is a rear perspective view of a modification of my invention.

In the drawing, similar reference characters refer to similar parts throughout the several views, and the sectional views are taken looking in the direction of the little arrows at the ends of the section lines.

Considering the numbered parts of the drawing, the blade 1 of my improved weeding hoe is curved, as shown in Fig. III particularly, the concave side of said blade facing upwardly. A ferrule 2 is attached to the top of said blade, to which a handle 3 is attached. The lower edge of the blade 1 is provided with a plurality of teeth 4 having sharpened points 5, which points enter the ground around the weeds and loosen and break up the earth to assist in the removal of the weeds. Notches 6 of V-shape are formed in the blade by the teeth 4 and the upper edges of the teeth 4 are blunt so that the edges adjacent the bottom of the notches 6 are dull whereby the root stocks or nodular growths at the base of the weeds are grasped in said notches and are held thereby without being subjected to a cutting action. A stiffening bead 7 may be provided at the side edges of the blade 1 in order to stiffen the structure, the stiffening bead being shown particularly in Figs. I and II.

In Fig. IV I have shown a modification of my invention in which this stiffening bead 7 is omitted.

In operation, the sharpened points 5 of the teeth 4 enter the ground around the weeds and loosen the earth or rake the part of the weeds above the ground or separate them from the grass of the lawn, to facilitate the removal of the said weeds. The root stocks of the weeds enter the notches 6 and are engaged by the blunt edges thereof. To remove the weeds, the blade 1 is rocked upon its lower convex surface as a lever fulcrum, which lever action serves to pull up the weeds by the roots, power being supplied at the top of the blade through the handle 3 and the ferrule 2, the convex surface of the blade 1 serving as a fulcrum and the work being done at the notches 6, 6, where the weeds are gripped. The teeth should be of less than half the width of the blade in order that sufficient surface should be allowed for the fulcrum action of the convexed under side of the blade. In this manner I have provided a weeding hoe in which the weeding operation can be accomplished very effectively without stooping over, the weeds being pulled instead of being cut off, the sharpened points of the teeth 4 serving to loosen the earth to facilitate the weeding operation, which is a pulling operation rather than a cutting one. This is of special advantage in removing weeds and foul grasses, such as knot grasses, from lawns, all of which foul stuff has some sort of protuberance or nodule or other irregularities near the surface of the ground. The invention is especially valuable in removing buck's-horn plantain. These weeds can be raised out of the grass by the sharp projecting points of the teeth and when in this position can be very readily grasped by the V-shaped notches between the teeth and pulled out. A very small and negligible percentage of the grass of the lawn is injured by this method.

I am aware that the particular structure which I have here shown and described is susceptible of considerable variation without departing from the spirit of my invention, and, therefore, I do not wish to be restricted to the same. I have found, however, that this particular embodiment is to be preferred and therefore I desire to claim the same specifically as well as broadly as indicated by my appended claims.

Having thus described my invention, what I claim as new and desire to secure by Letters Patent is:

1. A weeding hoe comprising a curved blade provided with a stiffening bead along its side edges and having at its lower edge a plurality of teeth having sharpened points and blunt upper edges forming V-shaped notches, the lower convex surface of said blade serving as a fulcrum upon which said blade may be rocked, substantially as set forth.

2. A weeding hoe comprising a curved blade, convexed side downward, having a plurality of teeth on its lower edge, said teeth being of less than half the width of said blade and provided with sharpened points and blunt upper edges forming V-shaped notches, the lower convex surface of said blade serving as a fulcrum upon which said blade may be rocked, substantially as set forth.

In witness whereof, I have hereunto set my hand and seal in the presence of two witnesses.

SIDNEY M. ISBELL. [L. S.]

Witnesses:
RALPH W. ISBELL,
S. E. BEEMAN.

Copies of this patent may be obtained for five cents each, by addressing the "Commissioner of Patents, Washington, D. C."